Figure 1:
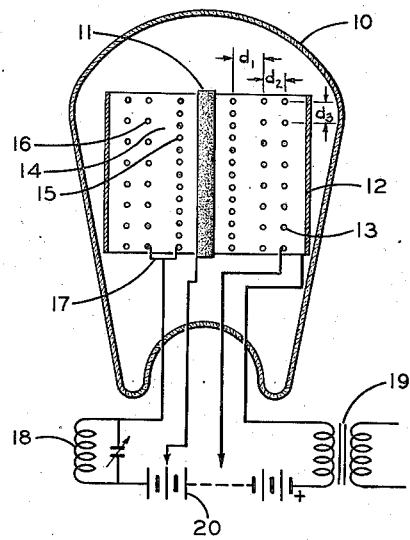

Oct. 4, 1938.　　　O. H. SCHADE　　　2,131,921

ELECTRON DISCHARGE DEVICE

Filed March 25, 1938

INVENTOR.
OTTO H. SCHADE

BY *Charles M. Clair*
ATTORNEY

Patented Oct. 4, 1938

2,131,921

UNITED STATES PATENT OFFICE 2,131,921

ELECTRON DISCHARGE DEVICE

Otto H. Schade, West Caldwell, N. J., assignor, by mesne assignments, to Radio Corporation of America, a corporation of Delaware Application March 25, 1938, Serial No. 197,977

5 Claims. (Cl. 250—27.5)

My invention relates to electron discharge devices, more particularly to improvements in multi-grid tubes utilizing so-called screen grids.

In multi-grid tubes employing screen grids the control and screen grid electrodes have been positioned with their turns or apertures in alignment so that the control grid acts as a shield for the screen grid to reduce the screen current. However, difficulties are introduced when the control grid has either a fine mesh, which construction is used for producing a tube having a high amplification factor, or when the control grid has a variable pitch to provide a variable mu grid. In both cases it becomes difficult to line up the screen grid with the control grid. In the case of the fine mesh grid it is necessary to bring the screen grid close to the control grid so that the beams formed by the control grid turns will pass between the turns or through the apertures of the screen grid and not strike the solid portions or turns of the screen grid. The effect of this close spacing is to increase the interelectrode capacity and introduce a further undesirable effect. When the screen grid is of very fine mesh and with the anode spaced a conventional distance from the screen grid, the screen current again increases due to the secondary electrons emitted from the anode and either a suppressor grid is necessary or the anode must be moved sufficiently far away from the screen grid to provide a space charge to suppress the secondary electrons.

It is a principal object of my invention to provide an electron discharge device of the multi-grid type and utilizing a screen grid and having a low screen current and high amplification characteristic.

More specifically it is an object of my invention to provide in multi-grid screen grid tubes a novel type of control grid which results in a tube having a comparatively high amplification factor but at the same time a low screen current.

A still further object of my invention is to provide a multi-grid screen grid tube in which a fine pitch control grid or variable mu control grid can be used adjacent the cathode but which nevertheless has a low screen current, low interelectrode capacity, and a high amplification factor, and a tube of this nature which may be easily constructed.

Briefly, a tube made according to my invention comprises a cathode and an anode, and a plurality of intermediate grids, one of said grids being a screen grid and the other a control grid adjacent the cathode, the control grid or electrode comprising either a narrow pitch grid element adjacent the cathode and a second wider pitch grid element spaced from the first grid element and electrically connected to the second grid which is in alignment with the screen grid. The fine mesh or narrow pitch grid element can be replaced by a variable mu grid element. The wider pitch grid element of the signal grid focuses the electrons so that they pass through the grid wires of the screen grid. It is, therefore, unnecessary to align the narrow pitch or variable mu control grid element and screen grids and because of the wide spacing between the turns of the coarse mesh or wide pitched element of the control grid, the screen grid can be placed further away from the control grid so as to reduce interelectrode capacity. At the same time conventional spacings may be used between the screen grid and the anode.

Figure 2:
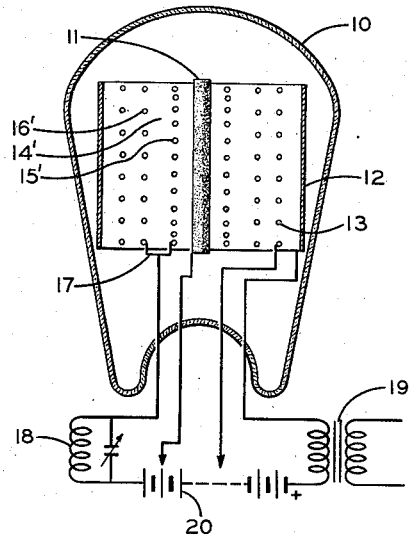

The novel features which I believe to be characteristic of my invention are set forth with particularity in the appended claims, but the invention itself will best be understood by reference to the following description taken in connection with the accompanying drawing in which Figure 1 is a schematic section of an electron discharge device made according to my invention and its associated circuit, and Figure 2 shows a modification of the tube shown in Figure 1 and its associated circuit.

Referring to the drawing an electron discharge device made according to my invention comprises an envelope 10 containing an indirectly heated cathode 11 and anode 12. Positioned between the cathode and anode are a plurality of grids, one of which may be the screen grid 13. In accordance with my invention I position between the cathode and the screen grid a control electrode 14 comprising the narrow pitch grid element 15 and the coarse mesh or wide pitch grid element 16, the two grid elements being electrically connected as at 17 with the turns of the element 16 aligned with the turns of the screen grid 13. The input circuit 18 is connected between the control grid and cathode, and the output circuit 19 between the source of voltage supply 20 and the anode 12.

For best results the distance $d_1$ between grid element 15 and grid element 16 should be equal to or greater than the pitch $d_3$ between the turns of the grid element 16 and the screen element 13. The distance $d_2$ between the element 16 and screen grid 13 should not be greater than the pitch $d_3$ between the turns of the grid element to provide proper focusing. Inasmuch as the grid element 16 and screen grid 13 have a wide pitch these grids can be easily aligned and because of the wide pitch they may be spaced some distance apart, thus reducing the interelectrode capacity between these two grids and between the signal grid and the anode 12. Thus, with the arrangement shown a high mu can be obtained but at the same time the screen grid current is substantially reduced. While shown as wire grids, the grids could be perforated sheet cylinder electrodes employing the principles set forth above.

In Figure 2 the narrow pitch grid element of the control electrode has been replaced by variable mu grid element 15'. This tube has the same advantages however as the tube shown in Figure 1.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. An electron discharge device having an envelope containing a thermionic cathode and an anode, and a plurality of electrodes positioned between the cathode and the anode and including a screen grid electrode and a control electrode positioned between the screen grid electrode and the cathode and comprising a pair of spaced grid elements, the grid elements being electrically connected and wound with different pitches, the screen grid electrode and grid element of the control grid adjacent the screen grid electrode having the same pitch and being aligned.

2. An electron discharge device including an envelope containing a cathode and anode, and a plurality of electrodes between the cathode and anode and including a screen grid having a comparatively wide pitch, and a control electrode positioned between the cathode and screen grid and comprising a pair of spaced grid-like elements electrically connected, the grid-like element adjacent said cathode having a comparatively narrow pitch with respect to said screen grid, and the grid element adjacent said screen grid having the same pitch as said screen grid, said screen grid and grid element adjacent said screen grid being aligned.

3. An electron discharge device having an envelope containing a thermionic cathode and an anode surrounding said cathode, and a plurality of concentric electrodes between said cathode and anode and including a helically wound screen grid having a comparatively wide pitch and a control electrode positioned between the cathode and screen grid and comprising a pair of spaced concentric helically wound grid elements, the grid element adjacent the cathode having a narrow pitch between turns and the grid element adjacent the screen grid having a pitch between turns equal to the pitch between the turns of the screen grid, the grid element adjacent the screen grid and said screen grid being aligned.

4. An electron discharge device including an envelope containing a cathode and an anode, and a plurality of electrodes between said cathode and anode and including a screen grid of comparatively wide pitch, and a control electrode between said cathode and screen grid and including a pair of spaced grid elements, the grid element adjacent said cathode having a comparatively narrow pitch and the grid element adjacent said screen grid having the same pitch as said screen grid with its turns in alignment with the turns of said screen grid, the spacing between said screen grid and said control electrode being not greater than the pitch of the grid element adjacent the screen grid.

5. An electron discharge device including an envelope containing a cathode and an anode, and a plurality of electrodes between said cathode and anode and including a screen grid of comparatively wide pitch, and a control electrode between said cathode and screen grid and including a pair of spaced grid elements, the grid adjacent said cathode having a comparatively narrow pitch and the grid adjacent said screen grid having the same pitch as said screen grid with its turns in alignment with the turns of said screen grid, the spacing between said screen grid and said control electrode being not greater than the pitch of the grid element adjacent said screen grid, and the distance between the grid element adjacent the cathode and the grid element adjacent said screen grid being greater than the pitch of said screen grid.

OTTO H. SCHADE.